United States Patent
Zhang et al.

[11] Patent Number: 5,988,569
[45] Date of Patent: Nov. 23, 1999

[54] TRUCK CABLE PLUG AND HOSE GLADHAND HOLDER

[75] Inventors: Richard H. Zhang, Rowland Heights; John D. Jacobs, Brea, both of Calif.

[73] Assignee: R.A. Phillips Industries, Inc., Commerce, Calif.

[21] Appl. No.: 08/900,196

[22] Filed: Jul. 25, 1997

Related U.S. Application Data

[60] Provisional application No. 60/025,916, Sep. 11, 1996.

[51] Int. Cl.⁶ ....................................................... B60D 1/62
[52] U.S. Cl. ........................... 248/65; 248/314; 280/420; 439/528
[58] Field of Search ................................. 248/51, 65, 314, 248/75, 514, 512, 534, 538, 513; 280/420, 421, 422; 439/528, 574, 174; 211/60.1

[56] References Cited

U.S. PATENT DOCUMENTS

| | | | |
|---|---|---|---|
| 2,733,033 | 1/1956 | Gunderson | 248/51 |
| 3,176,257 | 3/1965 | Introvigne | 339/38 |
| 3,331,915 | 7/1967 | Lucci | 248/51 X |
| 4,067,635 | 1/1978 | Soberg | 280/422 X |
| 4,366,965 | 1/1983 | Rhodes | 280/421 |
| 4,738,641 | 4/1988 | Eversole, Jr. et al. | 439/528 |
| 5,232,103 | 8/1993 | Koenig et al. | 211/60.1 X |
| 5,410,894 | 5/1995 | Fox et al. | 280/420 X |
| 5,607,221 | 3/1997 | Justus | 280/420 X |
| 5,630,728 | 5/1997 | Watters, Jr. | 439/528 |
| 5,660,408 | 8/1997 | Johnson | 280/420 |

FOREIGN PATENT DOCUMENTS 68846   11/1948   Norway.

*Primary Examiner*—Derek J. Berger
*Attorney, Agent, or Firm*—Christie, Parker & Hale, LLP

[57] ABSTRACT

A holder, mountable on the back of a truck tractor cab, has two electrical plug receptacles and two gladhand keepers. The gladhand keepers are vertically directed and angled with respect to the mounting surface of the cab, so that an operator can store in the keepers the hose-end gladhands associated with the tractor without climbing on, leaning over, or stretching across the frame of the truck behind the cab. The electrical plug receptacles are at an angle away from the surface, making it easier for an operator to insert the plugs into the electrical plug receptacle and thereby reducing wear to the cables.

8 Claims, 3 Drawing Sheets

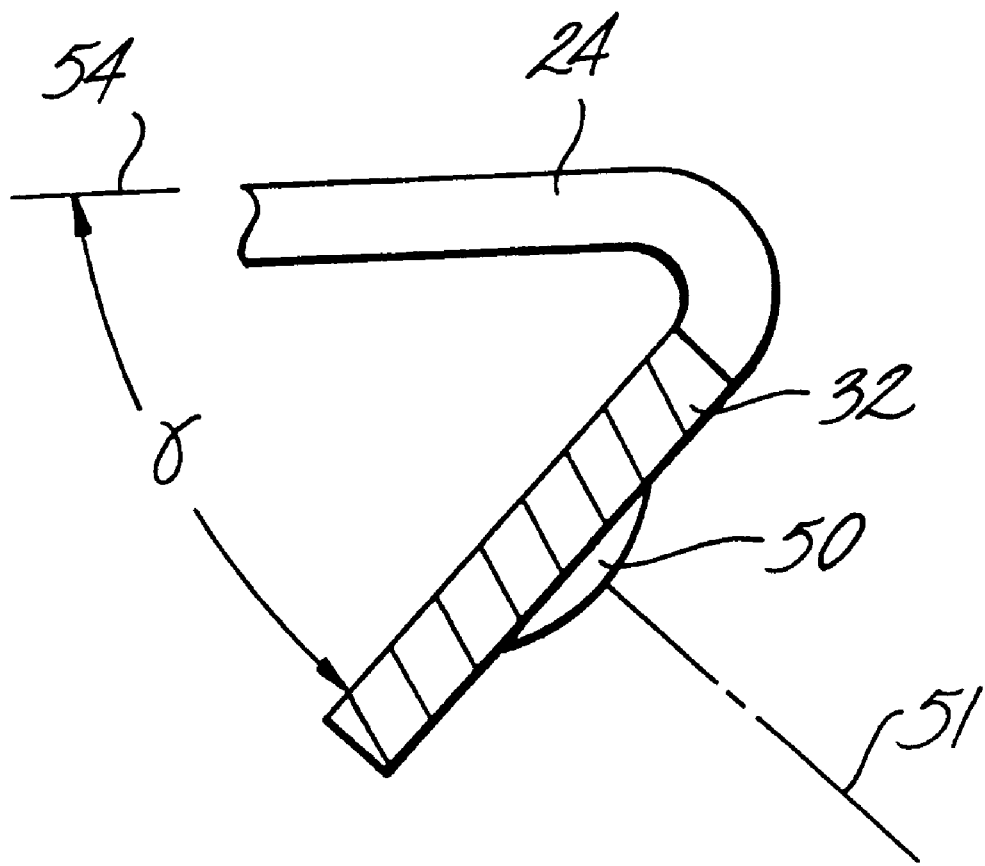

TRUCK CABLE PLUG AND HOSE GLADHAND HOLDER

This application claims benefit of Provisional Application Ser. No. 60/025,916 filed Sep. 11, 1996.

FIELD OF THE INVENTION

This invention relates to holders for storing air hose couplings and electric cable plugs, of the kind used in tractor-trailer truck arrangements, when they are not in use.

BACKGROUND OF THE INVENTION

Trailer trucks are conventionally provided with air brakes on the trailer which require connection to the trailer of air lines extending from an air compressor on the truck tractor cab to the brakes at the wheels of the trailer. For this purpose, air hoses extend from cab coupling units known as gladhands to gladhand couplings at their rear or trailer ends. The air lines extending from the brakes of the trailer also end in gladhands at the front of the trailer. The hose end gladhands together with the gladhands of the trailer form fixed coupling units on the forward end of the trailer. A complete gladhand connection is composed of a pair of essentially identical gladhand couplers which conform to an applicable standard developed and promulgated by the Society of Automotive Engineers so that any one gladhand coupler will cooperate with any other gladhand coupler. The face-abutted gladhands fully mate by turning one on the other. The use of gladhand couplers permits the rapid, pneumatic communication to air brakes of the trailer from the pump on the truck cab. The standard gladhand is adapted to serve as a quick connect and disconnect coupling for the two high-pressure air brake hoses which are known as service (signal) and emergency hoses.

Further, trailer trucks are conventionally provided with a multi-conductor electrical cable extending from the truck cab to the trailer to power the electric lamps and other electrical apparatus on the trailer. When the cab is disconnected from the trailer, the electric cable and air hoses must also be disconnected from the trailer. It has been common practice to provide a dead or dummy electrical socket on the rear of the cab for storing and holding the plug carried at the rear end of the electric cable when it is not connected to a trailer, and it is also common to provide gladhand keepers on the back of the cab to hold the gladhands carried at the rear ends of the two air hoses carried by the tractor when those hoses are disconnected from a trailer.

A simpler solution has been provided where a holder having two gladhand keepers and one electrical plug receptacle is mounted on the back of the cab toward the driver's side of the cab. Generally, it is easier to engage the gladhands in the keepers when the operator is positioned in alignment with the plane in which the gladhands are rotated as they are attached to and disconnected from the keepers. To be aligned with the engagement plane of the gladhands in the keepers, a current keeper design requires the operator to be positioned directly behind the cab while storing and releasing the gladhands. Thus, the operator must climb onto the frame extending from the back of the cab. Climbing on the frame behind the cab increases the risk of injury to the operator. If the operator is large enough, it may only be necessary to lean over, or stretch across the frame over the fuel tank and the battery box, but leaning over or stretching across the frame can lead to a loss of footing especially in adverse weather conditions. Thus, for even the large operator, the current gladhand holder design creates a significant risk of injury. At a minimum, location of the operator to the side of the gladhand/keeper engagement plane is ergonomically undesirable, affords poor leverage on the gladhand, and can cause muscle strain.

Further, the current design orients the electric plug vertically. When the tractor is moving and the electric plug is in the receptacle, the cable bounces around and gravity pulls down on the cable thereby bending the cable at the junction between the plug and cable. Because the plug is oriented vertically, the forces of gravity and motion combine to bend the cable up to 180°. Thus, the vertical orientation of the plug has caused cables and their casings to wear at the junction between the plug and the cable, thus requiring replacement. Further disadvantages of a vertical disposition of a stored electrical cable plug in a cab-mounted plug storage receptacle are described below.

With the increasing number of electrical circuits in them, many trailers, particularly those having automatic braking systems, require that two electrical cables be connected to them to adequately power all trailer circuits. Thus, tractor cabs have been modified to provide two electrical umbilical cables to such trailers. Therefore, the current holder designs are insufficient to store the required number of electrical cables and air hoses.

Thus, securely storing all the required electrical cables and air hoses in a convenient manner is desirable to prevent damage to the cables and air hoses, simplify storing the cables and air hoses, and reduce the risk of injury during storage and removal of the cables and air hoses in and from cab-mounted storage devices.

BRIEF SUMMARY OF THE INVENTION

There is, therefore, provided in the practice of this invention a novel holder comprising a mounting frame with a plurality of electrical plug receptacles connected to the frame; preferably these are two plug receptacles. The receptacles have an outer wall which defines an inner cavity. Electrical plugs can be inserted into the cavities wherein they engage a plug engagement section of an inner surface of the cavity. A means is provided for mounting the frame to a surface such as the back of a truck cab.

In a preferred embodiment, the holder performs multiple functions and has, in addition to the electrical plug receptacles, a plurality of gladhand keepers attached to the mounting frame; preferably these are two gladhand keepers. The gladhand keepers extend at an angle of approximately 45° from the mounting plane. The angle of the keepers facilitates more convenient and more ergonomically sound coupling of the hose end gladhands to them and reduces the risk of injury. The electrical plug receptacles also extend away from the mounting plane at an angle of approximately 45°. This reduces wear at the junction between the plug and cable, and facilitates insertion of the plug into the receptacle. Further, the top surfaces of the electrical receptacles are angled downward from horizontal to allow access to the fasteners which mount the holder to the cab wall and facilitate insertion of the plugs into the receptacles.

These and other features and advantages of the present invention are more fully set forth in the following Detailed Description and the accompanying drawings in which similar reference characters denote similar elements throughout the several views.

BRIEF DESCRIPTION OF THE DRAWINGS

FIG. 3 is a partial cross-sectional view of the holder of FIG. 1 taken along line 3—3 in FIG. 1.

DETAILED DESCRIPTION

Figure 1:
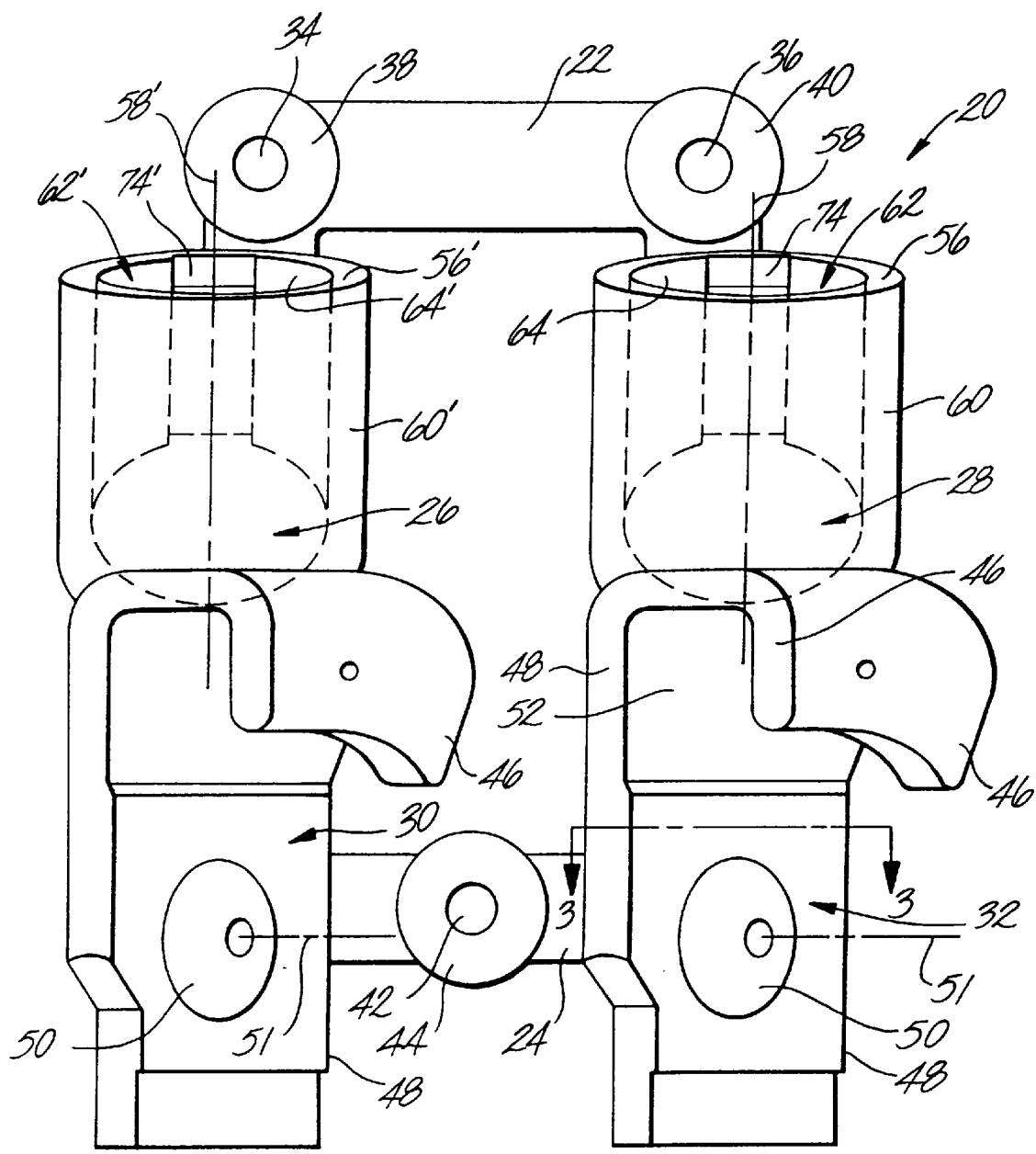
FIG. 1 is a elevational front view of a four function holder according to the present invention.
Figure 2:
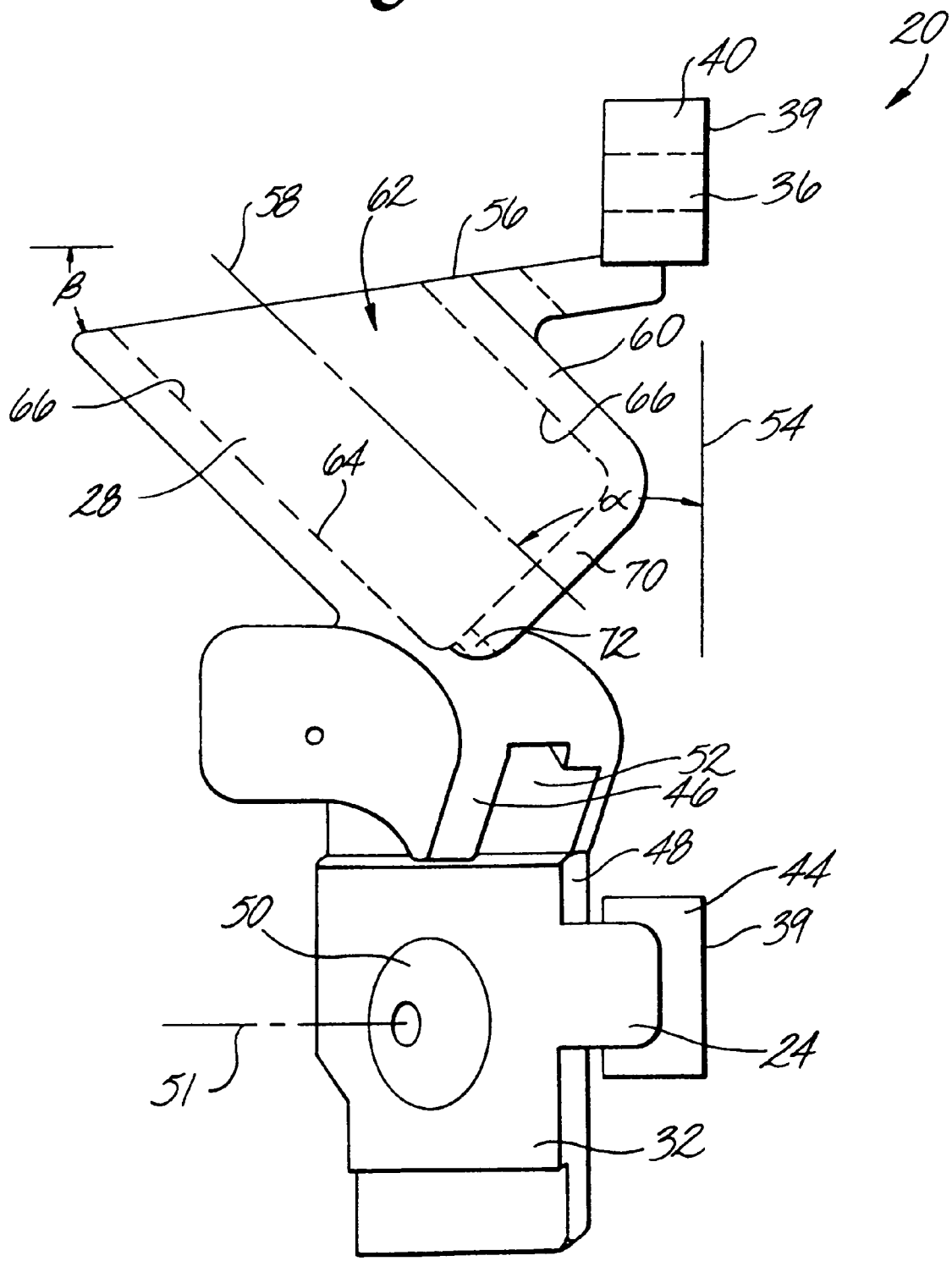
FIG. 2 is a passenger side view of the holder of FIG. 1.

FIGS. 1 and 2 show a four function holder, generally designated 20, with an upper mounting bar 22 and a lower mounting bar 24 corporately forming a mounting frame for mounting the holder onto the back of a truck cab. The holder is referred to as a four function holder because it is arranged to service and store a pair of cable end electrical plugs and a pair of air hose end gladhand coupling moieties. The holder has a driver side electrical receptacle 26 and a passenger side electrical receptacle 28 connected directly to the upper mounting bar. The holder also has a driver side gladhand keeper 30 and a passenger side gladhand keeper 32, both of which are connected to the lower mounting bar and to the bottoms of the corresponding electrical receptacles.

The upper mounting bar 22 has two bores 34, 36 extending through bosses 38, 40 located at the ends of the bar. The bores receive conventional fasteners, such as bolts (not shown) and the fasteners together with the mounting bars provide a means for mounting the holder. The fasteners are inserted through the bores and thread into corresponding threaded bores in the back of a tractor cab, preferably near the left side of the cab. The lower mounting bar 24 has a central bore 42 through a boss 44 to receive a fastener. The fastener is inserted through the central bore and threaded into a corresponding threaded bore in the cab. As the fasteners are tightened they engage the bosses and secure the holder to the cab. The rear walls 39 (see FIG. 2) on the mounting side of the bosses 38, 40, 44 are preferably in the same plane, so that the holder mounts flat against the outer wall of the cab.

The three bores define a triangle which conforms to a standard mounting pattern and size for tractor gladhand and single plug holders. Any modification to the holders preferably will not change that pattern or interfere with access to the fasteners.

Each gladhand keeper is connected to the lower mounting bar and is generally conventional in that it conforms to Society of Automotive Engineers (SAE) Standard J318, which is fully incorporated herein by reference, in essential and necessary respects, so that it is capable of engaging with and mating to any gladhand also conforming to that Standard. Each gladhand keeper is vertically oriented and has an inverted J-shape comprising a short leg 46 and a long leg 48; see FIG. 2. The long leg of each keeper has a centrally located protrusion 50 near its lower end in a defined relation to the keeper short leg 46 and to the gap or pocket 52 which is formed between the opposing faces of the keeper long and short legs at the upper end of the keeper. Gap 52 between the short and long legs receives the finger portion of a standard gladhand (not shown), and the protrusion acts as a guide and pivot center. Each keeper protrusion 50 is centered on and defines an axis 51 about which a gladhand coupling moiety is rotated relative to the keeper to engage the gladhand in the keeper after the palm of the gladhand has been placed on the protrusion. Disengagement of a stored gladhand from a keeper is achieved by rotating the gladhand in the opposite (counterclockwise) direction about axis 51. Further, the protrusion prevents the buildup of pressure in the hose. The keeper utilizes these and other conventional features, a description of which is not necessary for an understanding of the invention. See, for example, Part Nos. 12-006, 12-008, and 12-010 of Phillips Industries, Inc., Montebello, Calif.

To enable an operator to attach gladhands to the keepers without climbing onto the frame behind the cab, the keepers preferably are angled at forty-five degrees (45°) to the left relative to the cab as shown in FIG. 3. Specifically, the gladhand keepers mounting angle γ is defined in a horizontal plane that is perpendicular to a mounting plane 54 defined by the rear walls 39 of the bosses 38, 40, 44, and thus, the keepers are angled at 45° rearwardly and to the left with respect to the outer wall of the cab which is the preferred mounting surface. That mounting angle can range from 0° to approximately 60°. Because the holders are predominantly mounted on the driver (left) side of the cab, the gladhand keepers angle toward the driver side. That is, the gladhand keepers are angled toward the side from which the operator will regularly store the electrical plugs and gladhands. Thus, an operator can be positioned perpendicular to the gladhand/keeper engagement axis 51, i.e., in alignment with the plane in which the gladhand is rotated to engage and disengage it in the keeper without climbing on, leaning over, or stretching across the frame behind the cab. In that position, the human operator is in a good ergonomic position to most effectively apply to the hose end gladhands the forces required to mate and separate the gladhands to and from their storage keepers.

Electrical receptacles 26, 28 preferably are identical, and in the preferred embodiment shown, the receptacles are substantially identical. Thus, the features of only the passenger side receptacle will be described. However, the driver side receptacle will be labeled with similar reference numerals that are primed (i.e.').

The driver and passenger side electrical receptacles 26, 28 are upwardly open and are attached to the upper mounting bar 22 of the mounting frame just below the upper bosses 38, 40. Those receptacles are located in holder 20 at positions which afford convenient access to holder mounting bores 34, 36 so that the holder is readily mountable to a tractor cab rear wall. The top surface 56 of the receptacle is angled slightly downward from horizontal by an angle β. In the preferred embodiment shown, the angle is approximately 8°. The angle β is large enough so that the receptacles do not interfere with access to the holder mounting fasteners. The receptacles are connected to the gladhand keepers directly above the corresponding keeper, and the receptacles are mounted at the same height on the holder and have parallel central axes 58. Each plug receptacle has an outer wall 60 defining an inner cavity, generally designated 62, for receiving electrical plugs. Preferably, the outer wall is circumferential, and the cavity is cylindrical and centrally located in the receptacle. The diameter of the cylindrical cavity is modestly larger than the outer diameter of a standard truck electrical plug, so that the plug can slide easily into the cavity. The plug size, geometry and features conform in essential respects to an applicable SAE Specification J560 for electrical plugs, which is hereby fully incorporated herein by reference. The cavity 62 has an inner surface 64 with at least one plug engagement section 66. When the plug is inserted into the receptacle, gravity acts on the electric cable, and the cable pulls the plug so that it is skewed in the cavity. Thus, the plug frictionally engages, at least in part, the plug engagement sections, and the plug is thereby frictionally held in the receptacle. If desired, the surface texture of the plug engagement sections can be adjusted to more efficiently hold the plug in the cavity. The lower wall 70 of the receptacle is penetrated by at least one opening 72. The opening allows water and other debris to exit the bottom of the cavity preventing the plug from corroding or becoming fouled by debris. The cavity also includes a keyway 74 which mates with a corresponding key on a standard electrical plug conforming to the applicable SAE Standard J560. The cooperation of the plug key in keyway 74 secures a plug in the receptacle from rotating in the receptacle.

To reduce cable wear at the junction between the electrical plug and the cable, the axes 54 of the receptacles are at an angle α defined in a vertical plane that is perpendicular to the mounting plane 54. The angle α is preferably between about 30° and about 55°; in the preferred embodiment shown, the angle α is 45°. When the cab is moving and an electrical plug is in the receptacle of the holder, motions of the cable, augmented by gravity loads on the cable, bend the cable at the junction between the plug and the cable. Such motions can cold-work the cable conductors and produce failure of the cable which is not inexpensive to replace. The substantially inclined disposition of receptacle axes 58, as compared to a vertical disposition of those axes, results in a significant reduction in the magnitude of the loads which are imposed on cable conductors at the junction of the cables with plugs received in the receptacles. The consequence is that cable life is meaningfully extended. Also, if a plug is stowed in a vertical position, the loads on its cable act to cause the plug-to-cable seals to open, and water and other corrosive agents can enter the back end of the connector. The inclined position of a plug in holder 20 materially reduces those problems.

The inclined rather than vertical position of a cable end plug in holder 20 increases the clearance between the portion of the plug outside the plug receptacle and the rear surface of the tractor cab to which the holder is mounted. That larger clearance assures that the holder can readily accommodate plugs having extended finger grips, also called pull ears, which extend laterally from the plug body.

Because the receptacles are angled toward the position of an operator attempting to store electrical cable plugs in the cavities, the angle of the receptacle axes also facilitate insertion of the plugs into the receptacles. Further, as stated above, the top surface 56 of the receptacle is angled slightly downward by an angle β from horizontal. In the preferred embodiment shown, the angle is approximately 8°. Eight degrees (8°) is a large enough angle so an operator can more see readily into the cavity from a line of sight below the cavity, thus making it easier for an operator to see where the plug goes and easier to put the plug in the receptacle.

In addition to providing an ergonomically more satisfactory gladhand storage function in which a human operator can more easily position himself in alignment with the gladhand-to-keeper engagement planes, the placement of those engagement planes in an inclined rather than perpendicular relation to the holder mounting surface 39 has a further benefit. Although the plug receptacle axes 58, 58$^1$ are inclined to the vertical, they lie in planes which are perpendicular to the holder mounting surface. As a result, the cables connected to plugs placed in the holder receptacles tend to drape in those planes from the plugs. The gladhand keepers are located below the plug receptacles. Because the gladhand engagement planes of the holder are disposed at an angle to the vertical planes associated with the plug receptacles, the hoses connected to gladhands stored in the holder are not directly below the electrical cables. The hoses and cables are less likely to become tangled, thereby further eliminating plug and gladhand insertion and extraction hazards.

Thus, a truck gladhand and plug holder is disclosed which utilizes two electrical receptacles with angled axes and angled gladhand keepers to more efficiently and safely store electrical cable plugs and air hose gladhands at the back of a cab when the cables and hoses are not in use. While preferred embodiments and particular applications of this invention have been shown and described, it will be apparent to those skilled in the art that other embodiments and applications of this invention are possible without departing from the fair scope of this invention. For example, if the truck trailer has the usual electrical circuits, an ABS system and a rear lift gate mechanism, three electrical cables may be needed between the tractor and the trailer to supply the requisite amounts and kinds of electrical power to the trailer. In that event, the plug and gladhand holder could be comprised by a pair of gladhand keepers configured and disposed as described above and by three plug receptacles as described above and arranged with one receptacle between upper mounting basses 38 and 40 and with the remaining receptacles positioned so that the one receptacle is between them. It is, therefore, to be understood that within the scope of the appended claims, this invention may be practiced otherwise than as specifically described.

What is claimed is:

1. A truck electrical cable end plug holder comprising:
   a mounting frame having a mounting side;
   means for mounting the frame via the mounting side to a substantially vertical mounting surface;
   a plurality of upwardly open cylindrical electrical plug receptacles connected to the frame in horizontally adjacent relation to each other; and
   each electrical plug receptacle defining a substantially cylindrical inner cavity for receiving an electrical plug body and each cavity having an inner surface with a plug engagement section and a central axis which is inclined away from the frame mounting side and is disposed in a plane which is perpendicular to the frame mounting side.

2. The holder of claim 1 wherein at least one of said plug receptacle cavities has a central axis inclined from the mounting side of the frame at an angle of approximately 45°.

3. A multiple function holder for truck tractor hose end gladhands and cable end plugs comprising:
   a mounting frame having a mounting side;
   means for mounting the frame via the mounting side to a substantially vertical mounting surface;
   a pair of substantially vertically disposed gladhand keepers attached to the mounting frame, at least one of the keepers having a gladhand engagement surface inclined horizontally relative to the frame mounting side at an angle of approximately 45°; and
   a plurality of upwardly open truck electrical cable end plug receptacles attached to the mounting frame, the electrical plug receptacles each having a plug body receiving cavity which has a central axis, receptacles being inclined vertically from the frame mounting side at an angle in the range of from about 30° to about 55°.

4. A holder according to claim 3 in which there are a pair of said plug receptacles respective ones of which are disposed respectively above a corresponding gladhand keeper.

5. A holder according to claim 4 in which the corresponding gladhand engagement surfaces of the pair of keepers are substantially parallel.

6. A holder according to claim 5 in which the plug receptacle cavity axes are disposed in planes which are substantially perpendicular to the mounting surface.

7. A holder for truck cable end plugs and hose end gladhands comprising:

a mounting frame mountable to a substantially vertical mounting surface via a mounting side of the frame, a plurality of upwardly open cable end plug receptacles connected to the frame and having central axes disposed in respective substantially vertical planes disposed substantially perpendicular to the frame mounting side, each receptacle axis being inclined vertically from the frame mounting side in its plane at an angle of between about 30° and about 55°; and a pair of vertically disposed, inverted J-like gladhand keepers connected to the frame and having relative to the frame mounting side respective substantially vertical and substantially parallel gladhand engagement surfaces inclined to the mounting side at a horizontal angle of about 45°.

8. A holder for truck cable end plugs and hose end gladhands comprising:

a mounting frame mountable via a mounting side thereof to a substantially vertical mounting surface, a plurality of upwardly open cable end plug receptacles connected to the frame in horizontally adjacent spaced relation to each other, each receptacle defining a cavity configured for receiving at least the end portion of a conventional cable end plug the external aspects of which conform to SAE Standard J560, each cavity having an axis which is disposed in a vertical plane and is inclined in that plane from vertical away from the frame mounting side by an angle in the range of about 30° to about 55°, and a pair of vertically disposed and horizontally spaced gladhand keepers connected to the frame and each having a coupling surface matable with the face surface of a hose end gladhand conforming to SAE Standard J318, each keeper coupling surface being disposed vertically and inclined to the frame mounting side at an angle of about 45°.

* * * * *

UNITED STATES PATENT AND TRADEMARK OFFICE
CERTIFICATE OF CORRECTION

PATENT NO.     : 5,988,569
DATED          : November 23, 1999
INVENTOR(S)    : Richard H. Zhang and John D. Jacobs It is certified that error appears in the above-identified patent and that said Letters Patent is hereby corrected as shown below:

<u>Column 8,</u>
Line 18, after claim 8 insert claims 9 and 10 as follows:
-- 9. The holder of claim 1 in which there are two plug receptacles and which further includes a pair of gladhand keepers disposed below the plug receptacles. --
-- 10. The holder of claim 9 in which the gladhand keepers are disposed substantially parallel to each other. --.

Signed and Sealed this

Eleventh Day of June, 2002

*Attest:*

JAMES E. ROGAN
*Attesting Officer*    *Director of the United States Patent and Trademark Office*